United States Patent

[11] 3,599,160

[72] Inventors Elliot Nestle
Neptune;
Robert F. Schunneman, New Monmouth,
both of, N.J.

[21] Appl. No. 804,959
[22] Filed Mar. 6, 1969
[45] Patented Aug. 10, 1971
[73] Assignee Interdata Incorporated

[54] TIME DIVISION MULTIPLEXING
15 Claims, 10 Drawing Figs.

[52] U.S. Cl. .......... 340/172.5, 179/15
[51] Int. Cl. .......... G06f 9/18, H04j 3/00
[50] Field of Search .......... 340/172.5; 235/157; 179/15, 18.9; 178/50

[56] References Cited

UNITED STATES PATENTS

| | | | |
|---|---|---|---|
| 3,311,886 | 3/1967 | Herman et al. .......... | 340/172.5 |
| 3,377,619 | 4/1968 | Marsh et al. .......... | 340/172.5 |
| 3,408,632 | 10/1968 | Hauck .......... | 340/172.5 |
| 3,500,466 | 3/1970 | Carleton .......... | 340/172.5 |

*Primary Examiner*—Raulfe B. Zache
*Attorneys*—Maleson, Kimmelman and Ratner and Allan Ratner

ABSTRACT: Digital time division multiplexing system and method for multiplexing and demultiplexing between serial data from a plurality of data lines and data in the form of parallel characters. Individual data line units are operable for loading and unloading data and a multiplexor control unit controls in sequence groups of the data line units. A processor controls input serial data flow from each data line unit through a buss and the processor into core memory. A fixed wired program has logic connections to the processor, core memory, multiplexor control unit and clock and has fixed program instruction blocks to control the operation of the multiplexor control unit, to determine the start of a character and to then control the strobing of the input serial data in the core memory.

INVENTORS
ELLIOT NESTLE
ROBERT F. SCHUNNEMAN
BY
Maleson, Kimmelman & Ratner
ATTORNEYS.

INVENTORS
ELLIOT NESTLE
ROBERT F. SCHUNNEMAN
BY
Maleson, Kimmelman & Ratner
ATTORNEYS

TO 71

INVENTORS
ELLIOT NESTLE
ROBERT F. SCHUNNEMAN
BY
Malcom, Kimmelman & Ratner
ATTORNEYS.

INVENTORS.
ELLIOT NESTLE
ROBERT F. SCHUNNEMAN
BY
Maleson, Kimmelman & Ratner
ATTORNEYS.

INVENTORS.
ELLIOT NESTLE
ROBERT F. SCHUNNEMAN
BY
Meleson, Kimmelman & Ratner
ATTORNEYS.

INVENTORS
ELLIOT NESTLE
ROBERT F. SCHUNNEMAN
BY
Malcolm, Kimmelman & Ratner
ATTORNEYS.

INVENTORS
ELLIOT NESTLE
ROBERT F. SCHUNNEMAN
BY
Malsson, Kimmelman & Ratner
ATTORNEYS.

INVENTORS
ELLIOT NESTLE
ROBERT F. SCHUNNEMAN
BY
Melson, Kimmelman & Ratner
ATTORNEYS INVENTORS.
ELLIOT NESTLE
ROBERT F. SCHUNNEMAN
BY
Maleson, Kimmelman & Ratner
ATTORNEYS.

INVENTORS.
ELLIOT NESTLE
ROBERT F. SCHUNNEMAN
BY
Malcolm, Kimmelman & Ratner
ATTORNEYS.

TIME DIVISION MULTIPLEXING

BACKGROUND OF THE INVENTION

1. Field of the Invention

This invention relates to the field of art of digital time division multiplexors used for data communications.

2. Prior Art

For serial data communication purposes nonprogramable digital time division multiplexors (TDM) have been used. These hard-wired or special purpose multiplexors have left much to be desired in view of the difficulty and cost in modifying the multiplexors for changes in the data stream. Such changes in the data stream from the devices being multiplexed may be caused by changes in the code sets, character lengths, transmission rates, etc. In addition another limitation is that such special purpose multiplexors have fixed scanning rates and thus are unable to smooth out fluctuations in the data rates. Accordingly, special purpose multiplexors are limited in the number of devices they are able to handle for a predetermined band width. In addition to special purpose multiplexors, general purpose computers have been known to perform the TDM function by using stored program techniques. The basic disadvantages of such use of general purpose computers have been in the high cost of using a computer to perform only the specific function of multiplexing. As a general rule it is more costly to use a general purpose device for special purpose application.

SUMMARY OF THE INVENTION

A method of and system for time division multiplexing and demultiplexing between serial data in characters at a predetermined bit rate from a plurality of data lines and data in the form of parallel characters at a buss. An individual data line unit (DLU) is provided for each serial data line with each DLU being operable for loading and unloading data between its respective data lines and the buss. A multiplexor control unit (MCU) controls groups of the DLUs to load and unload the data. The MCU includes a clock for providing signals at intervals equal to a predetermined odd number times the bit rate of the serial data. An automatic data processor controls input serial data flow from each DLU through the buss and processor into a core memory. The serial data is converted into parallel characters in the core memory which then flows through the processor to the buss. Output data in parallel characters flows from the buss and the processor into core memory and parallel characters are converted to serial data in the core memory which then flows through the processor, buss to each DLU. A fixed wired program is provided having logic connections to the processor, core memory, MCU and clock to control the operation of the MCU and to determine the start of a character and to then control the strobing of the input serial data in the core memory.

The method of time division multiplexing and demultiplexing includes the following steps. The start of a character is first determined by recognizing when a line carrying the character is (1) idle whereby a predetermined transition in the state of the line indicates the presence of the start bit and (2) active whereby a transition in the state of the line does not represent the presence of a start bit. Clock signals are generated at predetermined odd intervals of the bit rate. A count of three of the intervals is provided after the determination of the start of a character thereby generating a new phase count. The data of each bit of the character is strobed at the new phase count and that information is stored and assembled with the remaining bits of the character being strobed at the new phase count.

BRIEF DESCRIPTION OF THE DRAWINGS

Referring now to FIG. 1 there is shown a digital multiplexor system in which a plurality of low speed serial data lines **12*a*—*ff* are multiplexed to provide data in the form of parallel characters at parallel input-output port 13. The multiplexor system comprises a respective data line unit 11*a*—*ff* for each of the data lines 12*a*—*ff*. In addition, the system comprises a multiplexor control unit (MCU) 14, a processor 15 having a core memory 18 and a read only memory 20. The serial data to and from each of the data line units (DLU) 11*a*—*ff* is controlled by processor 15 and memory 20 by way of unit 14. The input serial data is assembled into parallel characters and the output parallel characters are disassembled into the output serial stream. In FIGS. 1 and 2** dashed lines connecting blocks indicate control paths while solid lines indicate data paths.

Figure 1:
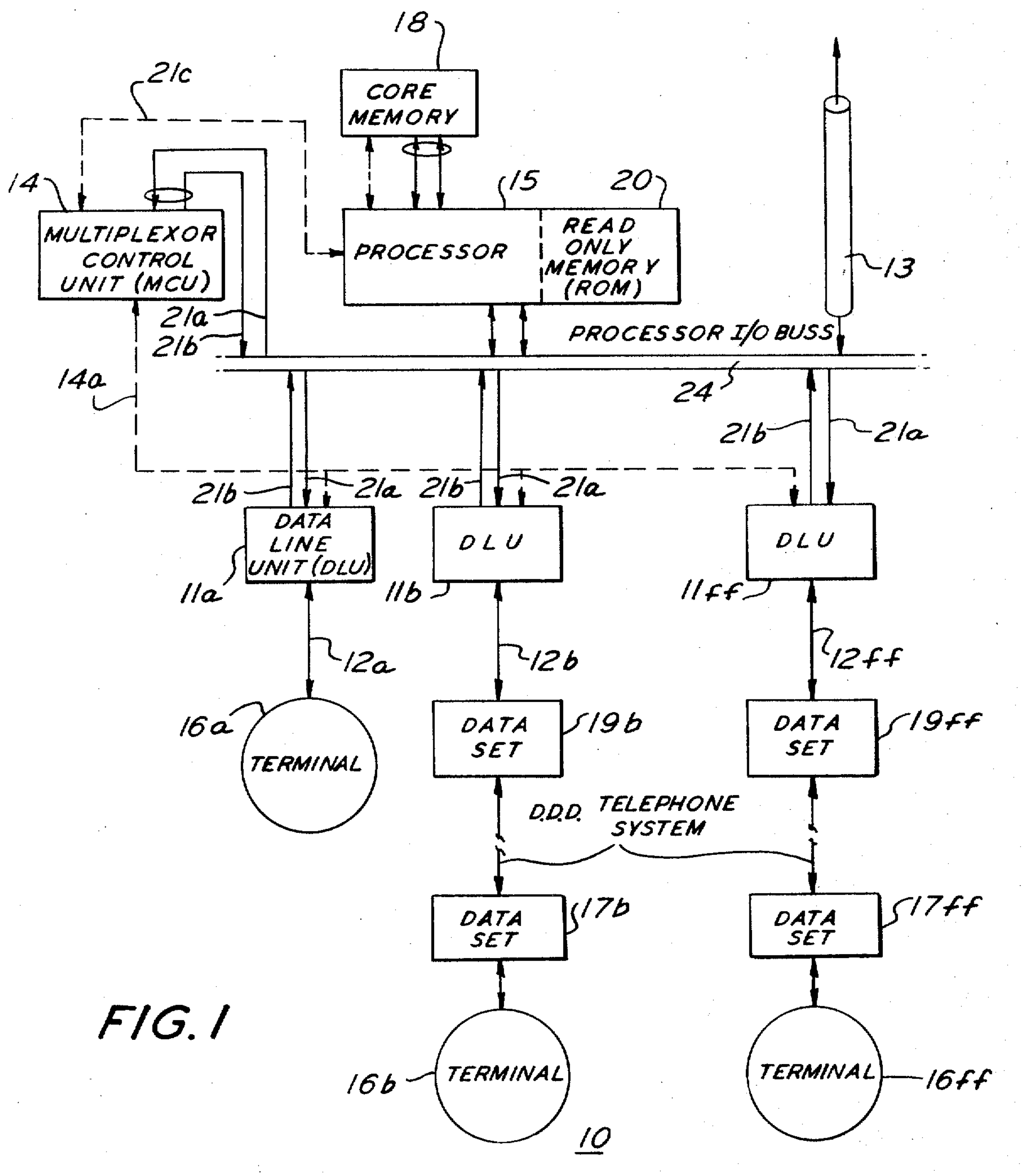
FIG. 1 illustrates in block diagram form a digital time division multiplexor system.

For example, flow of data may be traced from DLU **11*a*, paths 21*a*—*b*, processor input-output buss 24 and through processor 15 into core memory 18. This serial data is transformed into parallel characters which then flow from memory 18, through processor 15, buss 24 into port 13. The above described flow may be defined as input flow of data. Output flow of data may be traced by way of parallel characters flowing into port 13, through buss 24, processor 15 and into core memory 18. The data is then converted into a serial string which flows from memory 18 through processor 15, buss 24, paths 21*a*——*b* and then into DLU 11*a***.

The serial data flowing through lines **12*a*—*ff* may be provided by remote or local terminals such as local terminal 16*a* and remote terminals 16*b*——*ff* with each of the terminals comprising a teletypewriter for example. Terminals 16*b*—*ff* are connected to data sets 17*b*—*ff* respectively which are coupled through the DDD telephone system of the Bell Telephone System to data sets 19*b*—*ff* respectively and then to lines 12*b*—*ff*. Data sets 17*b*—*ff* and 19*b*—*ff* may be of the 103 type of the Bell Telephone System. On the other hand local terminals 16*a* is directly connected to line 12*a***.

Accordingly, terminal **16*b* is connected by way of data set 17*b*, the DDD system, data set 19*b* to provide a low speed serial stream of data in line 12*b*. Similarily, terminal 16*a* directly provides a low speed serial stream data in line 12*a*. Each of the units 11*a*—*ff*** is effective to convert the respective low speed serial stream provided by the data sets to standard digital computer logic levels.

Multiplexor control unit (MCU) 14 is effective to contr units **11*a*—*ff* to time share buss 24. In addition MCU 14 is effective to control the loading and unloading of data to and from lines 12*a*—*ff*. This control of units 11*a*—*ff* by MCU 14 is provided by way of a control path 14*a* to each of the units. Data path 21*b* and control path 21*c* are used by processor 15 to select MCU 14. Paths 21*b*—*c* are also effective to pass coded information to MCU 14 thereby to generate control signals which are then passed by way of control path 14*a* to units 11*a*—*ff*. Data path 21*a* from buss 24 is used for providing status information which is required upon selection of the coded information through paths 21*b*—*c***.

Figure 2:
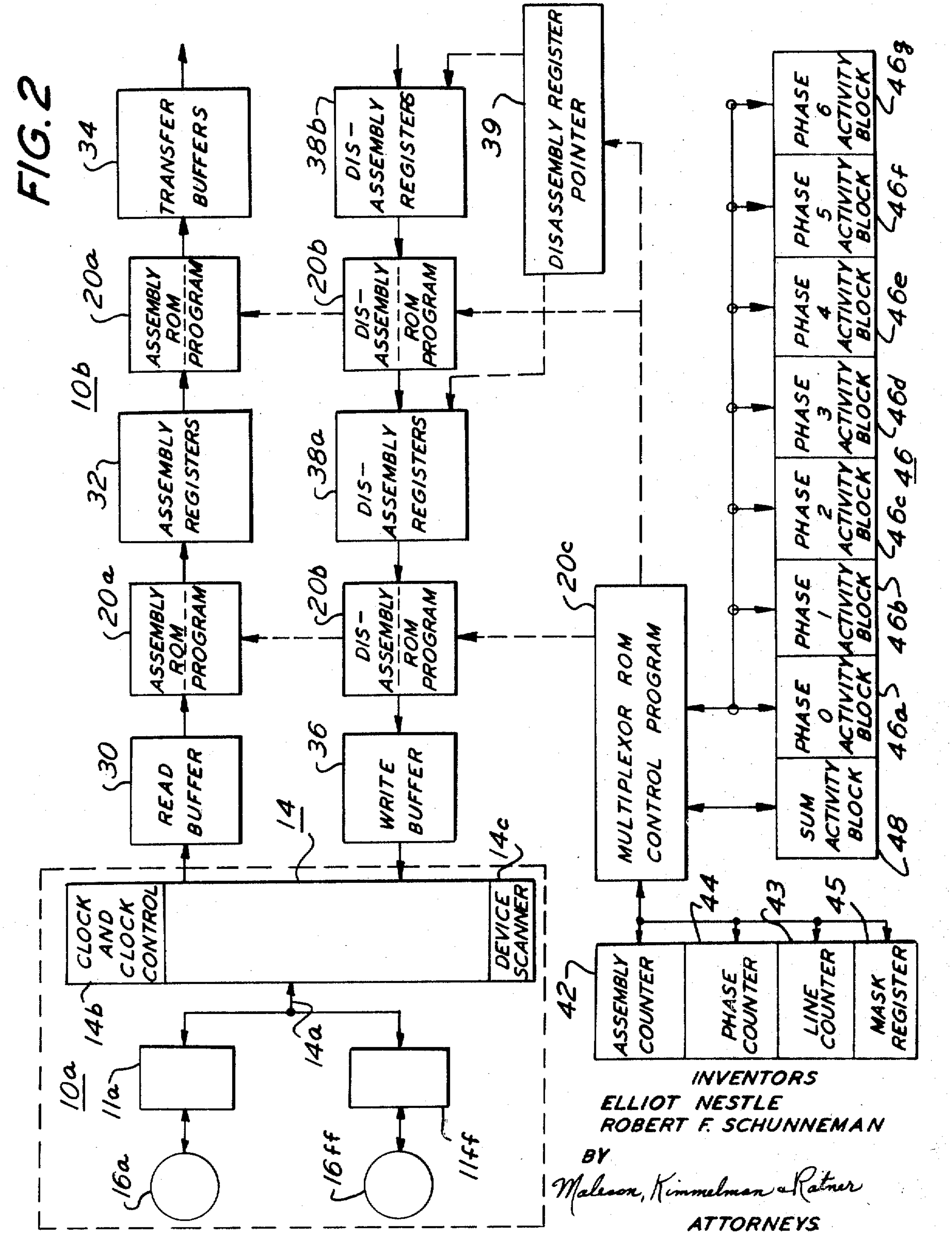
FIG. 2 illustrates in block diagram form the multiplexor system of FIG. 1 in its functional system configuration.
Figure 4:
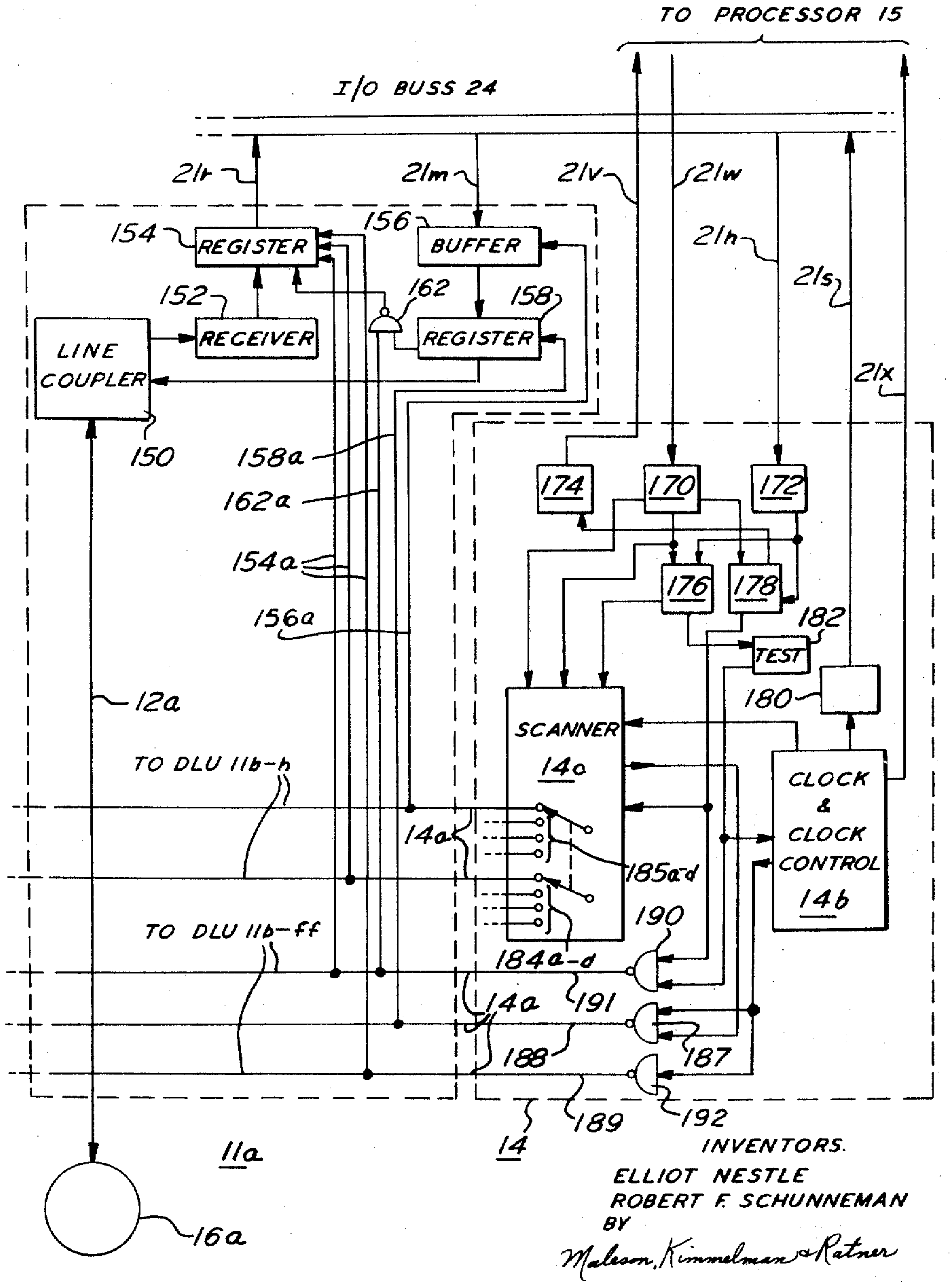
FIG. 4 illustrates in more detailed block diagram form the multiplexor control unit and one of the data line units shown in FIGS. 1 and 2.

Multiplexor control unit 14 includes a high precision clock and clock control **14*b*, FIGS. 2 and 4, which operates at seven times the bit rate of terminal 16*a*—*ff*. MCU 14 includes device scanner 14*c* and counters so that groups of eight of DLUs 11*a*—*ff* may be controlled simultaneously in parallel. The data flow from a group of eight DLUs such as DLU 11*a*—*h* flow into buss 24 in a parallel manner one bit per corresponding data line 12*a*—*h*. Buss 24 provides a common source of input and output data to processor 15 which processor and its associated read only memory (ROM) 20 provide the data manipulation which is required to that the serial data may be assembled and disassembled in core memory 18. For example, buss 24** may comprise eight data lines for input data, eight data lines for output data and control lines.

Referring now to FIG. 4 there is shown in more detail a DLU 11*a*, MCU 14 and connections to buss 24. While only one of the DLUs has been illustrated it will be understood that the remaining DLUs 11*b*—*ff* are identical in construction to DLU 11*a*. Line 12*a* comprises a plurality of wires depending on the nature of terminal 16*a*. Paths 21*a*—*c* each generally indicate a plurality of lines with (1) lines 21*m*—*n* being some of the lines of path 21*a* (2) lines 21*r*—*s* of path 21*b* and (3) lines 21*u*—*x* of path 21*c*. Line 12*a* is coupled to a conventional line coupler 150 and is effective to convert the low speed serial stream to standard digital computer logic levels. The output of coupler 150 is applied to a receiver 152 which comprises an amplifier, noise filter and threshold leveler. In this manner receiver 152 filters out line noise and establishes a desired threshold potential. The logic levels from receiver 152 are loaded into receiver register 154 by a control signal from MCU 14 by way of a line 154*a*. Subsequently, the receiver register 154 is unloaded by way of line 21*r* to buss 24 by another signal on line 154*a*. The foregoing control signal on line 154*a* to provide the loading function is under the direct control of clock and clock control 14*b* and therefore is not subject to programming jitter due to the variable nature of the programming execution time. In this manner the sampling accuracy of the input data on line 12*a* is a function of the accuracy of clock 14*b* and also to the degree of quantizing from the seven phases of the clock.

The foregoing operation of DLU 11*a* relates to the normal input function of data. With regard to the normal output function, a single bit of data is loaded in transmit buffer 156 from buss 24 by way of line 21*m*. This loading is under the control of line 156*a* from MCU 14. The contents of the transmit buffer is moved into transmit register 158 under control of line 158*a*. This movement takes place once per bit period and is not subject to jitter since line 158*a* is under the direct control of clock 14*b*. The contents of the transmit register 158 are applied to line coupler 150 in which the computer logic levels are converted to the levels suitable for terminal 16*a*.

A test mode of DLU 11*a* is initialed by a test signal from MCU 14. When the transmit buffer 156 is loaded from buss 24 a bit of data is placed in transmit register 158 and receiver register 154 at the same time by means of a test circuit 162 which is enabled by line 162*a*. Subsequently the receiver register 154 is unloaded to buss 24 and sends the bit of data back to processor 15. In this manner a bit of data flows through line 21*m*, transmit buffer 156, register 158 and then into register 154. That same bit of data is then returned to buss 24 so that processor 15 has the same bit of data coming back and can therefore analyze it.

MCU 14 includes a continuously running precision clock and clock control 14*b* which produces a processor interrupt signal which is applied by way of line 21*x* to processor 15. This interrupt signal is produced at seven times the data rate of terminal 16*a*—*ff*. In order to select MCU 14 a coded signal from buss 24 is applied by way of line 21*n* to receiver 172 and then to address circuit 178. In addition a select control signal is applied from processor 15 by way of line 21*w*, and receiver 170 to address circuit 178. Upon concurrence of these two signals MCU 14 is selected and can then respond to other control signals from path 21*c*. When processor 15 supplies control signals by way of line 21*w* to receiver 170 a composite signal is sent back by way of gate 174 and line 21*v* to processor 15.

After the selection operation, the condition of MCU 14 is checked by a control signal which is applied by way of line 21*w*, receiver 170, gates 180 and then back by way of line 21*s* to buss 24.

In the normal mode input operation an input control signal is applied by way of line 21*w* through receiver 170 to scanner 14*c*. The scanner is then effective by way of line 184*a* to control eight DLUs, e.g., 11*a*—*h*, to unload to buss 24 the eight respective receiver registers 154. Specifically, scanner 14*c* has a first switching step as illustrated in which DLUs 11*a*—*h* are unloaded. Upon application of a next input control signal and the next switching step the next eight DLUs 11*i*—*p* are unloaded etc. This input operation occurs on every phase of the seven phase clock 14*b*. This input operation is to be compared with the output operation later to be described, in which eight DLUs are loaded on each of four successive phases.

The forgoing describes the input operation and the output operation will now be described in detail. A load control signal is applied by way of line 21*w* to receiver 170 and then by way of a gate 176 to scanner 14*c*. Receiver 170 is similar to receiver 152 and comprises an amplifier, filter and threshold leveler. The other input of gate 176 is connected by way of receiver 172, line 21*n* to buss 24. Upon concurrence of a load control signal and a data signal on data line 21*n*, gate 176 is enabled and loads the present phase of clock 14*b* into scanner 14*c*. In this manner scanner 14*c* is preset.

Accordingly upon appearance of an output control signal on line 21*w*, that signal is applied by way of receiver 170 directly to scanner 14*c*. The scanner then applies a signal by way of the scanner switch to output buffer control line 85*a* thereby to select eight DLUs 11*a*—*h*. The selected eight DLUs load the respective transmit buffers 156 directly from buss 24. Upon appearance of the next output control signal on line 21*w*, the next eight LDUs 11*i*—*p* have their respective transmit buffers loaded, and so on. Accordingly on four consecutive phases of the seven phase clock 14*b* the 32 DLUs (11*a*—*ff*) transmit buffers are loaded in four successive groups of eight.

On the fifth phase of the clock, none of the transmit buffers 156 are loaded. However, a control bit is set in scanner 14*c* which is effective to send the next clock interrupt signal to all 32 DLUs. This signal is applied by way of gate 187 to line 188 to simultaneously load all 32 transmit registers 158 of DLUs 11*a*—*ff* from their respective transmit buffers 156. The foregoing occurs on one phase of the clock which is at the data rate of terminals 16*a*—*ff*. Accordingly, by using an interrupt signal to load transmit registers 158 there is avoided the jitter due to execution time which would occur if the signal were sent from processor 15. In addition, the clock signal is also applied to a gate 192 which provides a signal by way of line 189 to registers 154 of DLUs 11*a*—*ff*. In this manner, registers 154 are loaded from receivers 152 without program jitter.

In the test mode when MCU 14 has been selected a test gate 182 applies an enabling signal to a gate 190. Accordingly upon application of a signal from gate 178, gate 190 produces an output signal which is applied to all 32 DLUs by way of line 191 to produce the test operation previously described. This loading and unloading of the bit in the test operation is controlled by scanner 14*c* in manner similar to the normal input output operation.

It will be understood that the circuits shown in FIG. 4 are conventional elements. Specifically registers 154 and 158 and buffer 156 are conventional registers comprising a single flip-flop with associated gating for loading and unloading data. Similarly, conventional receivers 170 and 172 each comprise an amplifier, filter and threshold leveler.

In accordance with the invention, the four basic steps in the multiplexing operation may be described with respect to FIG. 2. The first step is the determination of the start of a character in which a character is defined as a serial string of fixed interval, fixed number of binary digits viz. 11 bits. The second step is the determination of the optimum time to strobe the input data stream on lines 12*a'ff*. The third step of the operation is the assembly of the data bits into a character. The foregoing three steps relate to the multiplexing of input data. The fourth step of the process relates to multiplexing output data in which the data is disassembled, serialized and then transmitted over lines 12*a*—*ff* to terminals 16*a*——*ff*.

The multiplexor system of FIG. 1 is shown in its functional system configuration in FIG. 2 which illustrates the two major components of the system viz., (1) the hardware portion 10*a* less the programs, tables and data in memories 18 and 20 and (2) the programs, tables and data 10*b* in core memory 18 and read only memory (ROM) 20. The tables and data buffers of core memory 18 are shown in 30, 32, 34, 36, 38*a*——*b*, 39, 42, 44, 46 and 48. The hardware portion 10*a* and memory 18 are controlled by (ROM) 20 which comprises sections 20*a*—*c*.

Blocks of data in core memory 18 have been reserved to enable ROM 20 to perform the function of assembly and disassembly (multiplex and demultiplex) of the serial data stream. Within this stream a character will further be defined as having a fixed number of binary bits the first of which is a start bit, followed by data bits and ending with one or more stop bits. One of the major functions of the multiplexor system is to sample the bits in the stream at the most center position of the bit thereby minimizing errors due to distortion. In order to accomplish this in accordance with the invention, each bit period is broken into seven equal intervals which shall be defined as phases 0—6. This timing is derived from the oscillator in the multiplexor control unit 14. In core memory 18 each phase 0—6 has been assigned an individual phase activity block 46*a*—*g*. Each block comprises a plurality of bits with one memory bit assigned per device 16*a*—*ff*. The memory bit being set defines the proper time at which a data bit should be sampled with the sampling taking place close to the geometric center of the data bit. In addition a block of memory 18 is defined as a phase counter 44 which counts from zero to six sequentially and is used to select the appropriate phase activity block 46*a*—*g*.

A further block of core memory 18 is assigned as assembly registers 32 which operate to transform the serial data stream into parallel characters. An individual assembly register is assigned to each of the devices 16*a*—*ff*. Transfer buffers 34 are assigned to provide buffering of the characters upon assembly. An individual transfer buffer is assigned for each device 16*a*—*ff*. A sum activity block 48 is used to indicate the activity state of each device. Specifically, one memory bit within block 48 is assigned to each device with each memory bit being set when the respective device is active and being reset when the respective device is inactive. A further block, read buffer 30 is used to temporarily store the serial data input from devices 16*a*—*ff*. Buffer 30 has assigned one memory bit per device. All of the foregoing blocks are associated with the input assembly function of core memory 18.

In the disassembly function of core memory 18, a block of core is assigned as an assembly counter 42 and provides a count corresponding to the data character period equal to seven times the number of bits per character. One of the set of disassembly registers 38*a*—*b* is used for placement of the characters which are to be disassembled and transmitted to devices 16*a*—*ff*. One register is assigned to each device 16*a*—*ff*. The other of the set of disassembly registers 38*a*—*b* is assigned as disassembly registers in which the parallel characters are serialized by stripping and transmitted to devices 16*a*—*ff*. One disassembly register is assigned to each device. The function of disassembly registers 38*a*—*b* are transitory in nature i.e., the function of each set of disassembly registers is alternately switched by means of a disassembly pointer 39. This provides maximum efficiency since the data need not be moved. While data is being disassembled from one set of disassembly registers, the other set is being filled. Write buffer 36 is assigned the function of temporarily storing the "stripped" or disassembled data to be transmitted to the devices 16*a*—*ff*.

A flow chart for the multiplexing system of FIGS. 1 and 2 is illustrated in FIGS. 3A—F. The rectangular blocks designate the functions to be performed and in general contain explanations of the process. Hexagonal boxes indicate decision branches and comparison quantities. The circular patterns depict program entry and exit points better known as branch locations.

The program depicted by the flow chart of FIGS. 3A—F is embodied in ROM 20 and it is this program which ties hardware 10 and core memory 18 together to perform multiplexing. Processor 15 is an Interdata, Inc., Model 3 Digital Computer. As will later be shown in detail, control of multiplexor control unit (MCU) or multiplexor control means 14 to effect time division multiplexing and demultiplexing is maintained by ROM 20. ROM 20 includes a fixed wired program to be used in conjunction with processor 15 and memory means or core memory 18. Processor 15 receives an interrupt signal from multiplexor control means 14 and transfers this information to the fixed wired program means within ROM 20. The fixed wired program within ROM 20 contains a fixed instruction block or sum activity program to determine the start of a character and provides the necessary data manipulation in core memory 18. The start of a character bit is recognized where the line activity bit has not been set and the line has been in the space condition with no previous activity. When a phase activity bit has been set by the fixed wired program within ROM 20, a branch is made in the routine. This activity bit having been set indicates a proper strobing point for the data on this line and, therefore, controls the strobing of the input serial data in core memory or memory means 18. The following paragraphs are a detailed description of the flow of programmed instructions of the fixed wired program within ROM 20.

Figures 3A, 3B:
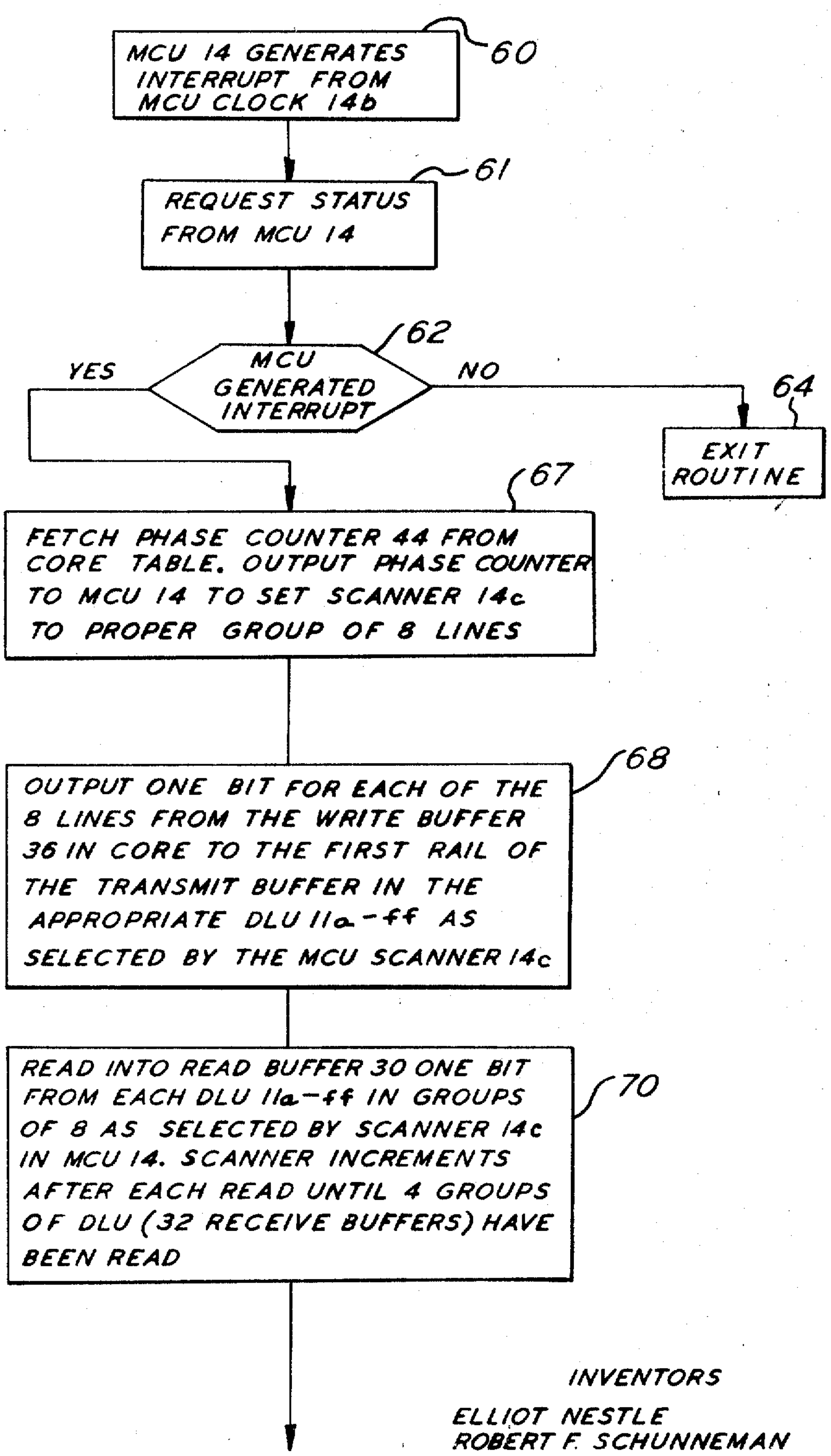
FIGS. 3A—F illustrate a flow chart in block diagram form for the multiplexing system of FIGS. 1 and 2.
Figure 3B:
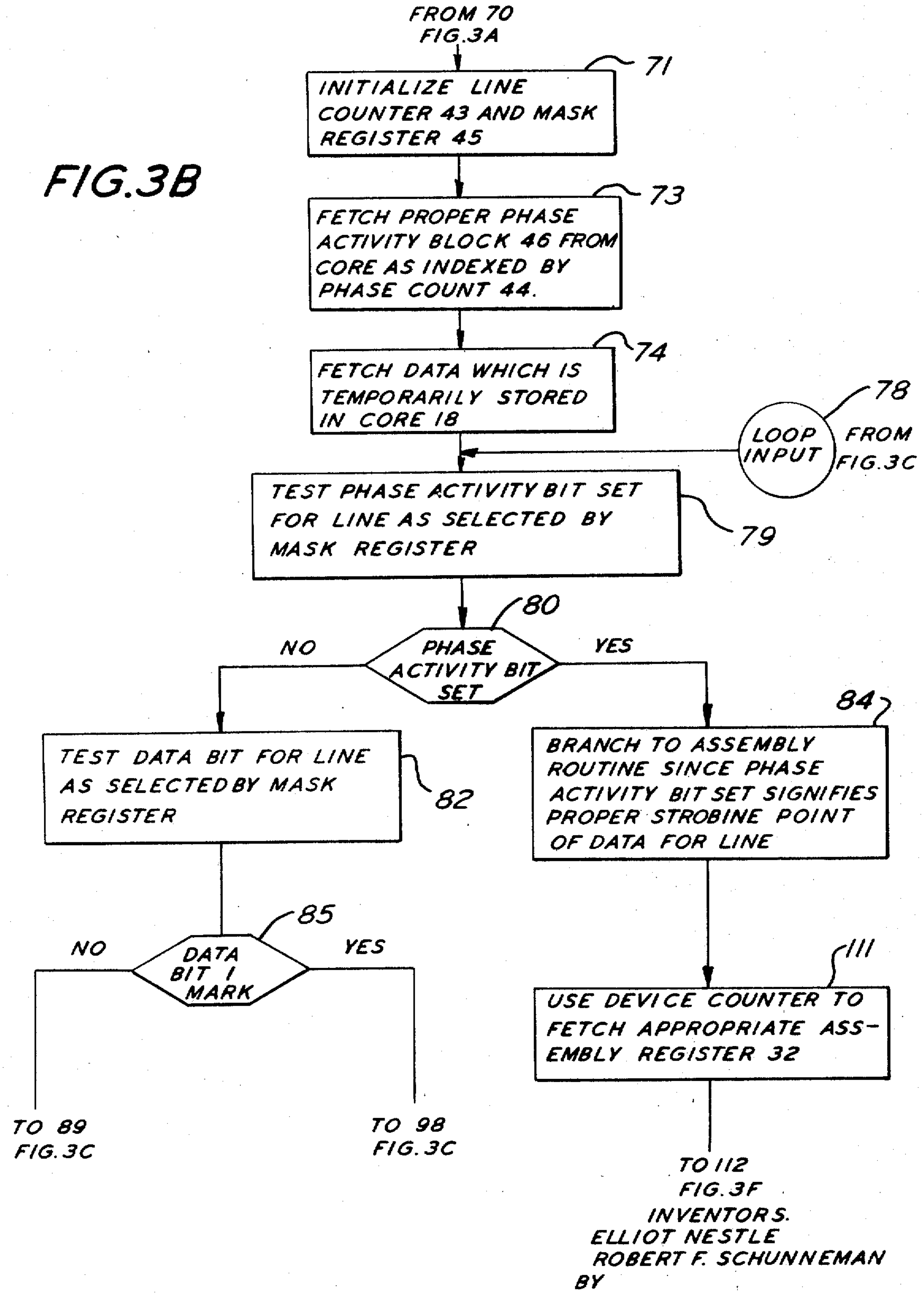

FIG. 3A—Block 60—The multiplexor control unit 14 (MCU) 14 generates an interrupt derived from the clock 14*b* in MCU 14, to processor 15.

Block 61—The processor recognizes the interrupt and transfers control to ROM 20. The ROM 20 program then requests the status from the MCU 14.

Block 62—As a result of the retrieve of status the ROM program determines whether or not the interrupting device was MCU 14.

Block 64—If the device interrupting was not MCU 14 as indicated by the retrieved status, a branch is taken to an exit routine. The exit routine passes control to the main program without further action.

Block 67—If the device interrupting was the MCU the phase count is fetched and is output to MCU 14 in order to get scanner 14*c* to the proper group of eight DLUs 11*a*—*ff*.

Block 68—The ROM 20 program then outputs one bit for each of eight DLUs from the write buffer to the first rail of the transmit buffer in the appropriate data line unit (DLU) 11*a*—*ff* as selected by the MCU scanner. This data was disassembled on a previous phase.

Block 70—The ROM program then reads into the read buffer one bit from each DLU 11*a*——*ff* in groups of eight as selected by the scanner. The scanner increments after each read until four groups of data line units have been read.

FIG. 3B—Block 71—The appropriate registers in processor 15 which will be used as a line counter 43 and a mask register 45 are initialized.

Block 73—The proper phase activity block 46 is fetched from core as indexed by phase count 44.

Block 74—The data which has been read from MCU 14 is temporarily stored in core memory 18.

Block 78—Is entry point to the program in which loops are executed.

Block 79—The phase activity bit for a given DLU is examined as selected by mask register 45.

Block 80—If the line phase activity bit is set, a branch is taken to an assembly routine, if not, further tests must be made.

Block 82—If the phase activity bit was not set, the data bit corresponding to the DLU as selected by the mask register 45 is tested to determine whether the data is a one signifying a mark condition or zero signifying a space condition.

Block 85—If the data read in was a one corresponding to a mark condition some further examination must be made in block 89. Sum activity block 48 is accessed and mask register 45 is used to determine if the line is active at this time.

Figure 3C:
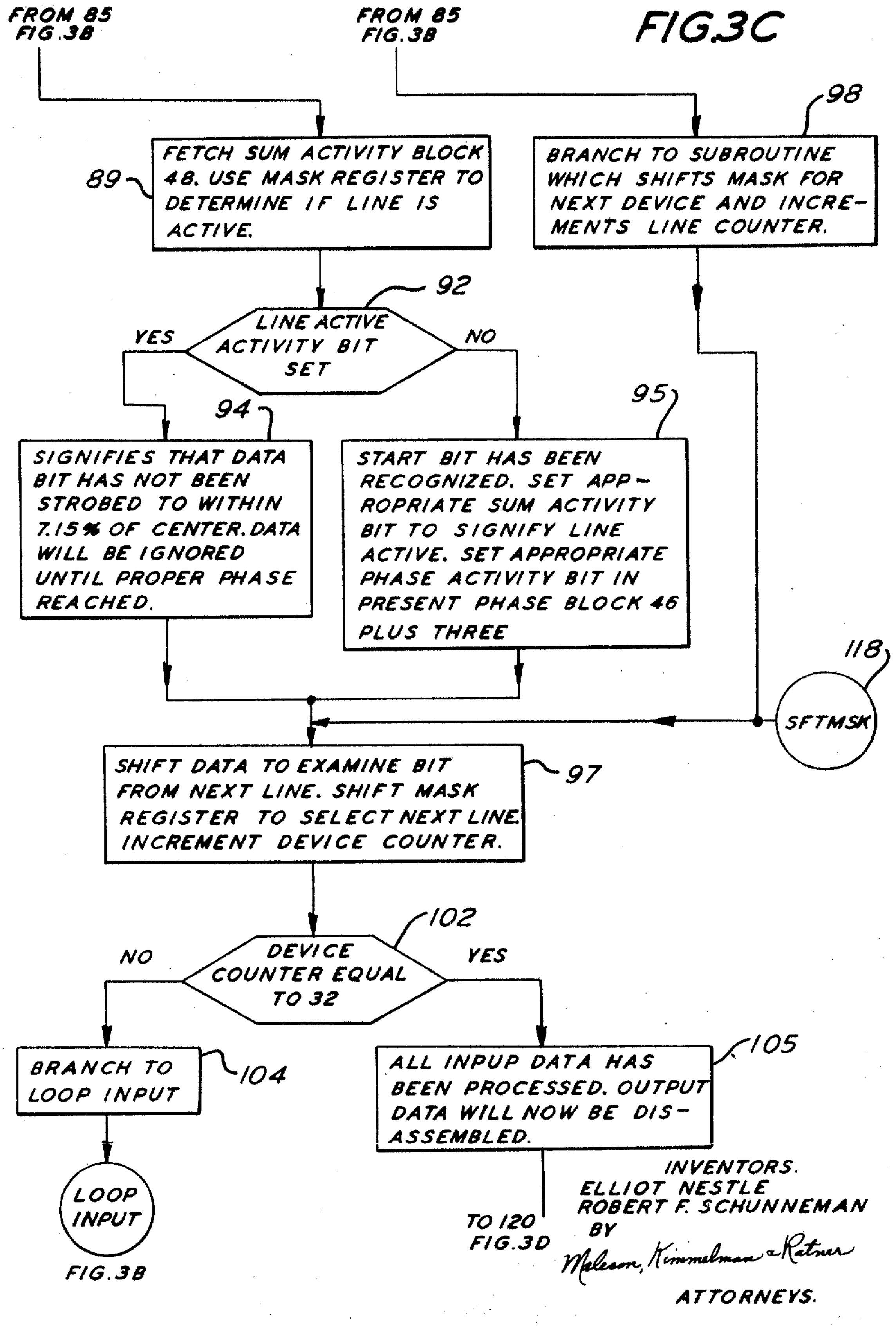

FIG. 3C—Block 89—Sum activity block 48 is fetched using the mask register to determine whether the line is active.

Block 92—If the line activity bit is set this signifies (as shown in block 94) that the data bit has not been strobed to within 7.15 percent of its center. Data will be ignored until the proper phase which will fall within 7.15 percent of its centerline has been reached.

As will later be described in detail by use of a seven-phase clock, i.e. division of each bit period into seven equal parts, data is strobed as described, to within 7.15 percent of the centerline. The number of phases per bit is directly proportional to the amount of time necessary to multiplex the data. That is, the larger the samples per bit period the more time is taken to multiplex the data. However, by use of an odd number of phases (samples) per bit the system is able to process data at a greater distortion which would be accepted by a system utilizing an even number of samples. For example a seven-phase clock provides a more precise centerline strobe than would an eight-phase system and yet a seven-phase system requires less time to multiplex than would an eight-phase system.

Block 95—Is entered if the line activity bit has not been set. If such is the case, the line being in the space condition without previous activity corresponds to a start bit having been recognized. In this case, the appropriate sum activity bit is set to signify that the line is going active and the appropriate bit in phase activity block 46*a*—*g* defined by the contents of the phase counter plus three, is set to insure the strobing of the data to within 7.15 percent of the center of the pulse. For example, if the start bit was recognized in phase zero, the phase activity bit would be set in phase three.

Block 84—(FIG. 3B)—If the phase activity bit was set, a branch is made in the assembly routine since the phase activity bit being set indicates the proper strobing point for the data on this line.

Figure 3D:
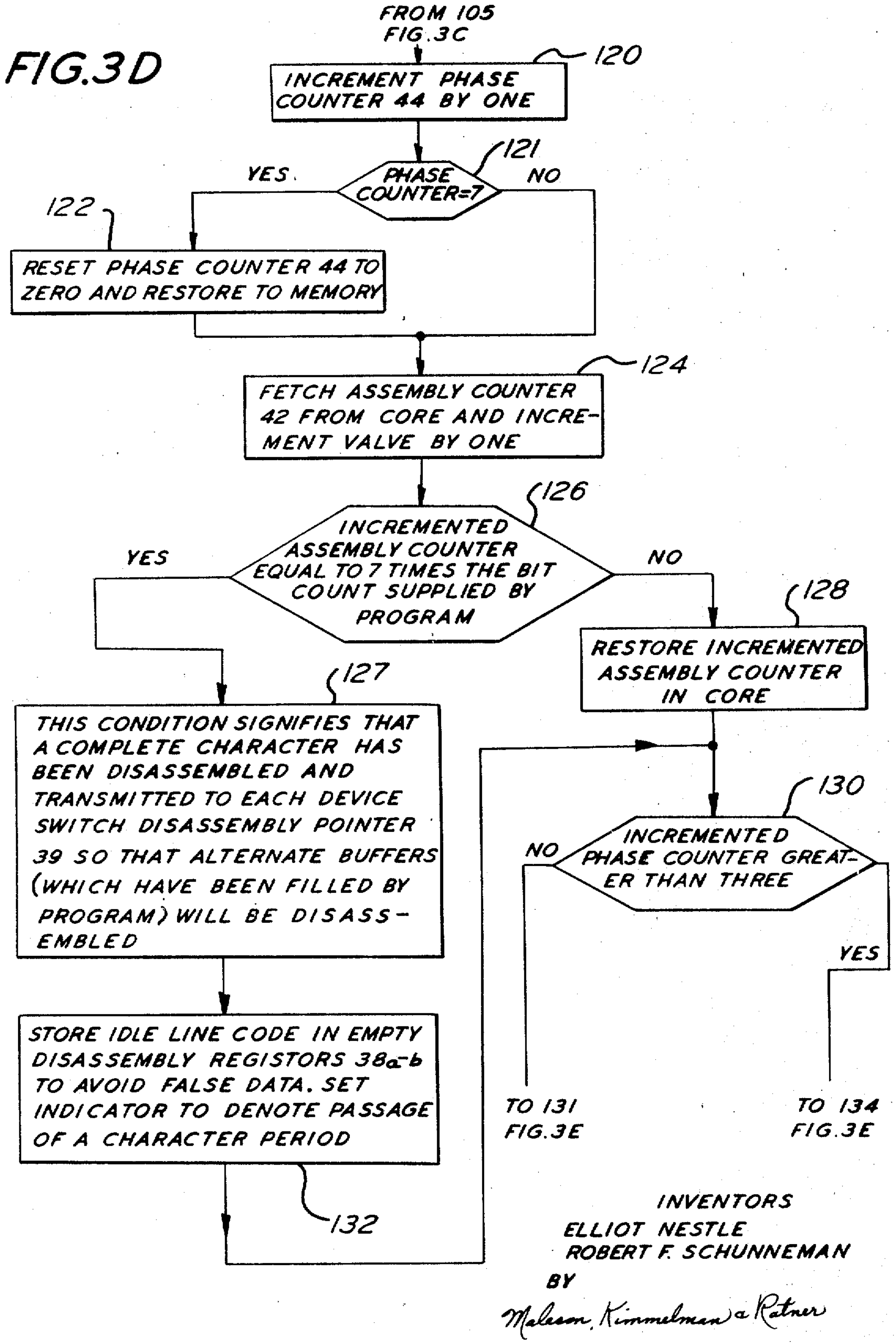
Figure 3E:
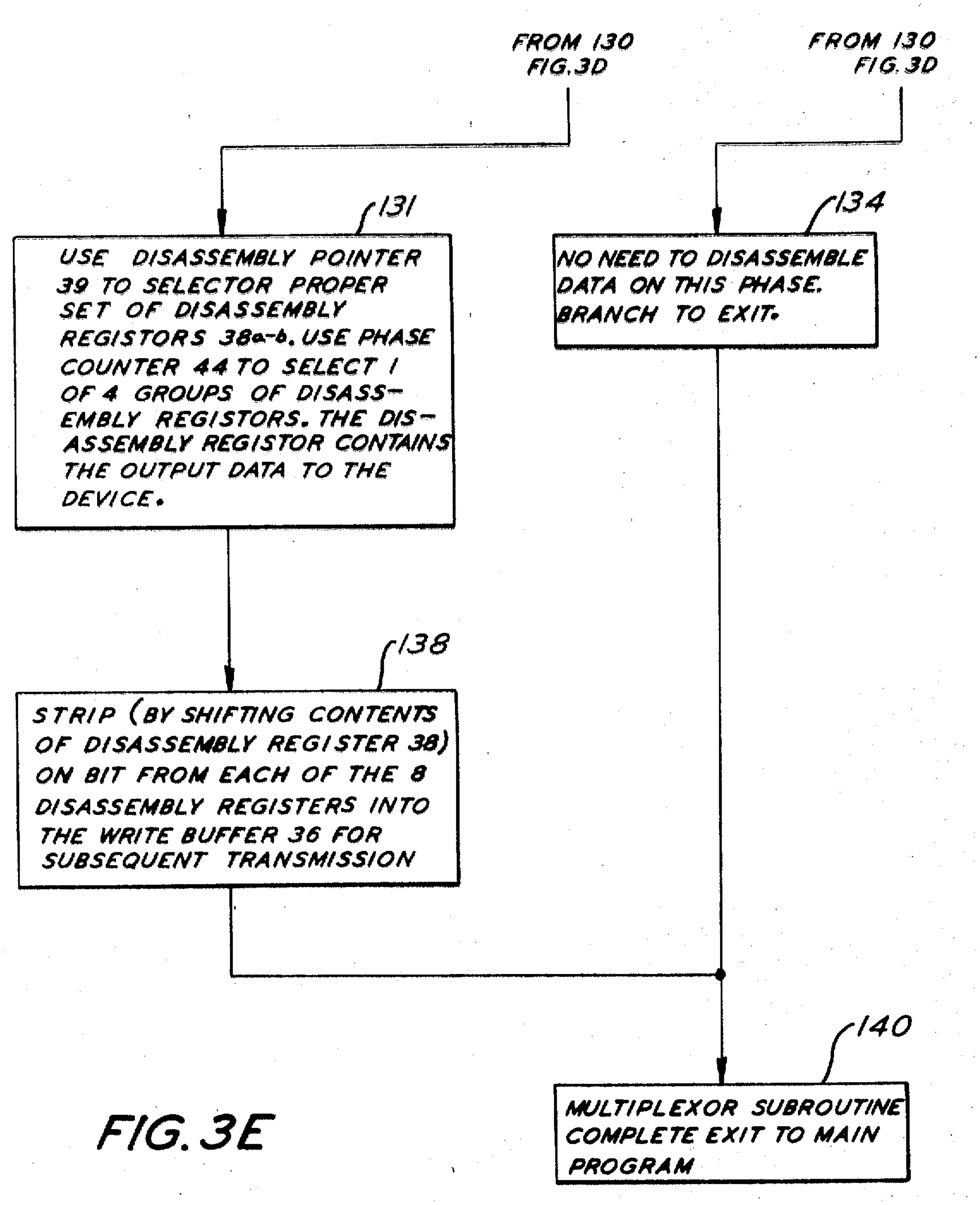
Figure 3F:
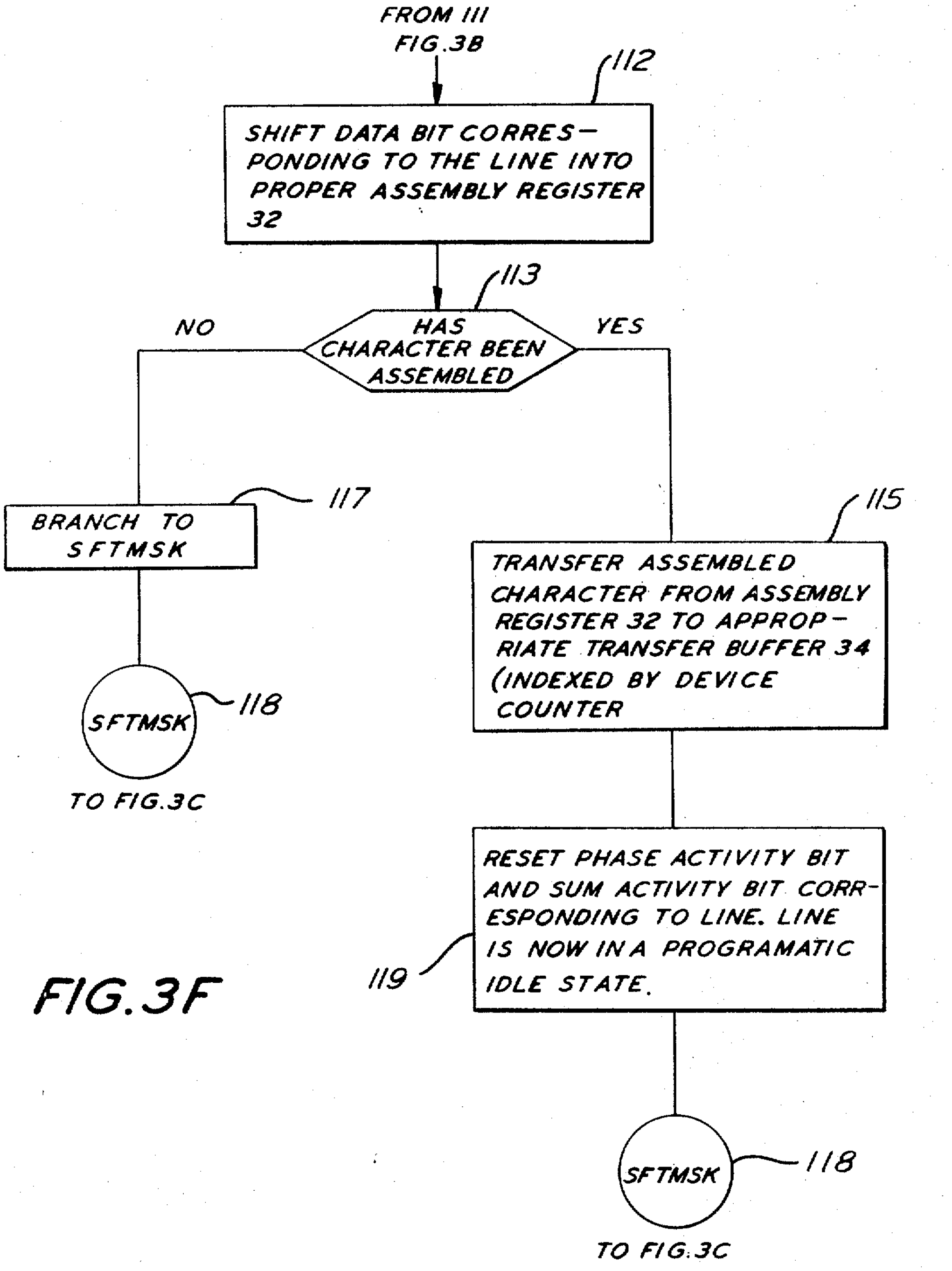

Block 111—(FIG. 3B)—Line counter 43 is used to fetch the appropriate assembly register 32. °FIG. 3F—Block 112—The data bit corresponding to the DLU is shifted into assembly register 32.

Block 113—Determines whether of not as a result of shifting into data bit the character has been assembled.

Block 117—If the character has not been assembled a branch is made to a subroutine called shift mask as shown in block 118.

Block 115—If a character has been assembled the assembled character is taken from assembly register 32 and placed in transfer buffer 34 as indexed by the line counter 43.

Block 120—(FIG. 3D)—The phase activity bit in the appropriate phase activity block 46 is reset as is the sum activity bit in sum activity block 48 corresponding to the DLU and associated terminal 16*a*—*ff*. The terminal is now in a programmatic idle state. A branch is then made to a subroutine called SFTMSK as shown in 118.

Block 97—(FIG. 3C)—The data is then shifted to examine a bit from the next DLU. Mask register 45 is then shifted in order to be able to select the appropriate bits in the registers and line counter 43 is incremented to select the next DLU data.

Block 102—(FIG. 3C)—The incremented line counter is compared to the quantity 32 since there are 32 terminals and associated DLUs in the system. If line counter 44 after incrementation is equal to 32, all the input data has been processed and a branch to the output subroutine is now made as shown in block 105. If line counter 44 is less than 32 the process is repeated by taking a branch to the input loop as shown in blocks 104, FIG. 3C.

This completes the input assembly portion to the ROM 20 program.

FIG. 3D—Block 120—Phase counter 44 is incremented by one. The phase counter is compared in block 121 to seven. If it is greater than seven the phase counter is reset to zero and restored in memory. Otherwise as shown in block 122 it is restored in its incremented value.

Block 124—Assembly counter 42 is fetched from core and is incremented by one. If the incremented assembly counter is equal to seven times the bit count this condition indicates that a character period has been completed.

Block 127—The completion of a character period implies that a character has been disassembled and transmitted to each device. At this point, the disassembly pointer 39 must be switched so that alternate disassembly registers 38*a*—*b* will be disassembled.

Block 132—The idle line condition is then stored in an empty disassembly register 38*a*—*b* to avoid the transmission of false data. An indicator is set to indicate the passage of a character period.

Block 128—If the incremented assembly counter is not equal to seven times the bit count, then the incremented assembly counter is restored in core memory.

Block 130—Since the output data rate is fixed and synchronous in nature the data is only output in phases zero, one two and three where in each phase the data is output to one group of eight DLUs. If the phase count is greater than three, there is no need to output data as shown in block 134, FIG. 3E and a branch is made to the exit routine as shown in block 140. If the phase count is equal to or less than three then data must be output as shown in block 131. Disassembly pointer 39 is used to select the proper set of disassembly registers 38*a*—*b*. The phase counter 44 is then used to select the proper group of eight disassembly registers 38*a*—*b* which will be output. The disassembly registers 38*a*—*b* contain the output data to be sent to the transmit buffer 156 of DLU 11*a*—*ff*.

Block 138—Fig. 3E—Output data to the DLUs are stripped by shifting 1 bit from each of eight disassembly registers 38*a*—*b* and copying the stripped bits into the write buffer 36 for subsequent transmission to the transmit buffer 156 of the FLU 11*a*—*ff*. A branch is then made to the exit subroutine shown in block 143.

Block 140—FIG. 3E—The multiplexor subroutine is now complete and an exit is made to the main program.

Figure 5:
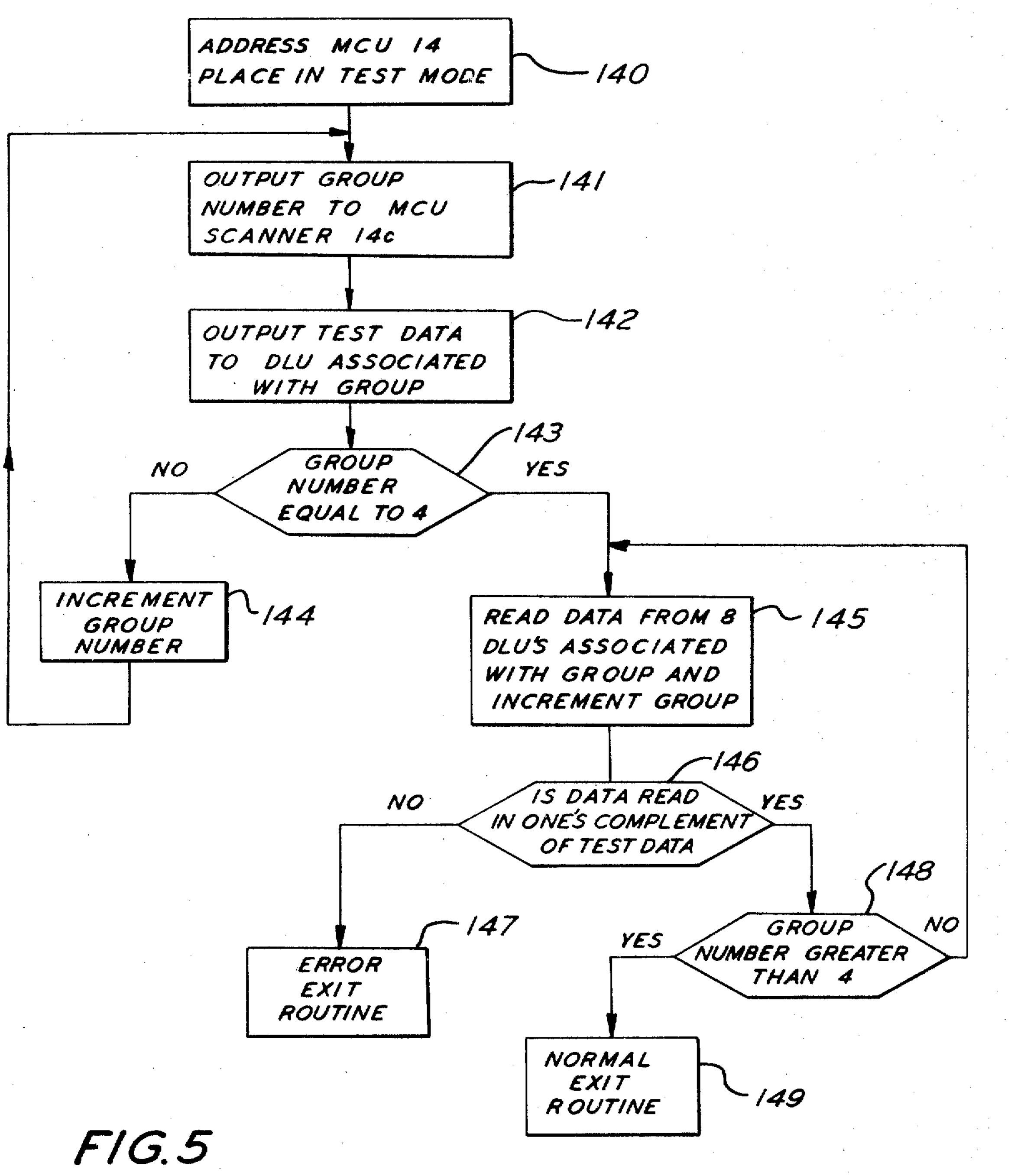
FIG. 5 illustrates in block diagram form a flow chart for an internal test program for the data paths of FIGS. 1 and 2.

The system has a built-in capability of determining the validity of the data paths associated with the multiplexor control unit 14, data line unit 11 and processor 15. This is done by output of data to the DLU while the MCU 14 is placed in a test mode. The data is then read back in and will appear in the register 154 and 158 of the DLU in its complement form. The output data is then compared with the input data and a correspondence is noted of any discrepancies between the data which is used to determine the cause of failure for the line associated with the discrepancy. This feature provides a good test of a large portion of the hardware associated with the multiplexing system. The flow chart for the program necessary to check out the data paths is shown in FIG. 5.

Block 140—The MCU 14 is addressed and placed in the test mode.

Block 141—A group number (0—3) is sent to the MCU scanner 14C thus selecting a group of eight DLUs.

Block 142—Test data is output to the selected group of eight DLUs.

Block 143—If four groups of eight DLUs 11*a*—*ff* have been output, a branch is made to the input test routine in block 145.

Block 144—If less than four groups of eight DLUs 11*a*—*ff* have been output, the group number is incremented and the next group of data is output in block 141.

Block 145—Data is read in from a group of 8 DLU 11*a*—*ff* and the group number is incremented.

Block 146—The data readin is compared to the test data transmitted in block 142. If the input data is not equal to the complement of the output data a branch is taken to error exit routine in block 147.

Block 148—If the data read is the complement of the data transmitted the group number is compared to 4. If the group number is greater than 4, then all 4 groups of eight DLUs have been read and verified and the normal exit routine block 149 is taken. If less than 5 groups of DLUs have been read a branch to block 145 is taken and the next group of DLUs are read.

In summary, the digital time division multiplexer system of the present invention provides multiplexing and demultiplexing between serial data from a plurality of data lines 12*a*—*ff* and parallel data at buss 24. The system comprises the DLUs 11*a*—*ff*, MCU 14 having a clock 14*b*, an automatic data processor 15, core memory 18 and a fixed wired program on ROM 20. ROM 20 has logic connections to processor 15, memory 18, MCU 14 and clock 14*b*.

Important steps in the operation of the multiplexor system may be summarized as follows:

A first step involves the ability to determine the start of a character. This is done by recognizing the change of state in a line 12*a—ff* from a mark to a space condition. If there is such a change in state, then this can be the start of a character. By accessing a block in memory by looking at the past history of the line the present state of the line can be determined. If the line was in an idle (mark) state i.e., not being used, then the transition (from mark to space) represents the presence of a start bit. On the other hand if the line is not idle i.e., an activity bit is set in memory, then the change of state does not represent the presence of a start bit. The invention provides a means of determining the start of a character by noting a line transition and accessing a block of core which defines the past history of the line.

Another step relates to the strobing of the bits in a character. It will be understood that the input data is normally asynchronous in nature and could be sampled at any time. As a result of the distortion qualities of the transmission produced by the lines and devices, ambiguities are introduced and therefore it is important that the sampling take place as close to the center of each bit as possible. Thus the bit should be divided into as many sampling intervals or phases as possible. However, the larger the number of intervals the greater the inefficiency in time and cost. With an odd number of samples per bit it is possible to minimize the offcenter line sampling deviation and at the same time maintain high efficiency by utilizing a lesser number of sampling intervals per bit period. In accordance with the invention the use of seven sampling intervals per bit period a maximum centerline offset of 7.15 percent is achieved.

The use of seven sampling intervals has a further advantage since distortion in the signal from data sets 17*a—ff* and 19*a—ff* may be from 10 percent to 15 percent. With seven sampling intervals and a cumulative timing error of 10 percent, the maximum permissible distortion is known to be over 16 percent. Thus a seven phase clock can be seen to provide more than adequate performance.

In order to utilize the foregoing seven intervals sampling, if a start character transition is detected then a count of three is added to the phase count in which the transition was detected. In this manner there is formed a new phase count. During the remaining bits of the character the data is then strobed at the new phase count. The interval timing is supplied by clock 14b.

Another step of the multiplexing operation relates to character assembly detection or knowing when a character has been assembled, viz., which bit is a stop bit. In order to determine this it is first required to know the number of bits per character. In the present invention the number of bits per character is used to generate a mask in assembly registers 32 which is being continually shifted as the character is assembled. Upon detection of a zero least significant bit in the mask the character assembly has been assumed to be completed. In general the character will be in the assembly register 38 right justified with the stop bit occupying the most significant bit or bits of assembly register. The presence of the stop bit is significant in that it serves to qualify the character as being legal or illegal as well as being utilized in determining the presence of a line break character.

A further step relates to disassembly. Although the input data is asynchronous and requires sampling, the output data is synchronous and is regulated by the multiplexing system Thus no sampling technique is necessary. By knowing the number of bits per character, a submultiple of the multiplexor clock 146 is used in gating out the data at the characteristic speed of the terminal i.e., one-seventh of the clock frequency. In each of the first four phases, 1 bit is sent to each transmit buffer 156 so that in a time interval for one character all terminals have received one character. Specifically, in phase zero DLUs 11*a—h* receive data, in phase one DLUs 11*i—p* receive data, in phase two DLUs 11*q—x* receive data and in phase three DLUs 11*y—ff* receive data. Thus each terminal 11*a—ff* is regulated at its characteristic speed which is then a submultiple of the system multiplexor clock 14b. The data in the transmit buffer 156 is gated to the transmit register on each clock period thereby eliminating output distortion due to program jitter.

A still further step relates to double buffering of the system which provides a high degree of time independence of the system operation. Once a character has been assembled in assembly register 32 it is transferred into transfer buffer 34. In this manner, a full character period is provided for the processing of the data in transfer buffer 34 while the next character could be in the process of being assembled in register 32. This double buffering is also provided in disassembly by registers 38*a—b*. The processing time of or full character period may be compared with a single bit period in singly buffered systems.

An additional step relates to interval testing. Data is transmitted around each of the DLUs 11*a—ff* and back into buss 24 providing a closed loop feature for checking the validity of the data transfer within the multiplexor control unit 14, data line unit 11 and processor 15.

R161-7

The assembly language listing for the ROM 20 program will now be provided. This listing is in the language of and is operated by the Interdata, Inc. Model 3 Digital Computer Micro code Assembler Program (part no. 05-009).

END 02810

SYMBOL TABLE

| | | | | | |
|---|---|---|---|---|---|
| ACK | 0004 | ACTBST | 0374 | ADRS | 0080 |
| ALLFIN | 0398 | BCKDIS | 0387 | BCKDS1 | 038C |
| BIM | 0300 | CHRC | 03E4 | CMD | 0008 |
| CORR | 036E | CYCRD | 0331 | DA | 0040 |
| DISL | 03B4 | DR | 0020 | ENDIS | 03C6 |
| ENDISP | 03C5 | FINRD | 0342 | FSTSTA | 0008 |
| FURLKS | 0312 | GOACT | 0368 | GOACT1 | 0357 |
| HW21 | 03FA | HW41 | 03FD | INCRD | 0338 |
| LOCCNT | 0026 | LOOP1 | 0347 | LOOP2 | 0351 |

R161-7 – Continued

| | | | | | |
|---|---|---|---|---|---|
| LOOPTR | 03F2 | NXTWDP | 03DC | ORIN | 03C1 |
| RDAGN | 0332 | REST | 03E2 | RSTPHR | 0388 |
| RTN41 | 0391 | RTPH21 | 0358 | RTRST | 03A0 |
| SFTCP | 03D5 | SFTMSK | 03D6 | SR | 0010 |
| TS1 | 0303 | TS2 | 0307 | TS5 | 0325 |
| TS7 | 032A | TS8 | 0333 | WAASSB | 037C |

MODEL 3 MICRO CODE

```
                    * 32 DEVICE MULTIPLEXOR/MOD 3 00010
                    * 05-013 00020
                          ORG X'300'         00030
0300  3080   BIM      C   SBS                SET BANK TO I/O 00040
0301  5D20            L   SDR,X'20'          ADRS OF MPX CLOCK A 00050
0302  5F80            L   SCR,L(ADRS)        00060
0303  2200   TS1      T   SYN                00070
0304  1103            B   L,TS1              00080
0305  5E00            L   SCR,X'0'           00090
0306  5E10            L   SCR,L(SR)          RETRIEVE MCV STATUS 00100
0307  2200   TS2      T   SYN                00110
0308  1107            B   L,TS2              00120
0309  4FD0            L   DFR,SDR,NC         LOAD STATUS INTO DFR 00130
030A  5E00            L   SCR,X'00'          00140
030B  5C26            L   MAL,L(LOCCNT)      00150
030C  1512            B   VL,FURLKS          BRANCH IF MPX CAUSED INTERRU
030D  4903            L   MDH,R0             00170
030E  4A13            L   MDL,R1             00180
030F  3740            C   PW+SBR
0310  5D00            L   RAH,H(FSTSTA)      ADVANCE TO NEXT INSTRUCTION
0311  5E08            L   RAL,L(FSTSTA)      00210
                    *INTERRUPT MUST BE CAUSED BY MULTIPLEXOR 00220
0312  4953   FURLKS   L   MDH,R5             CPY BRANCH ADRS TO LOCCNT 00
0313  4A63            L   MDL,R6             COUNTER 00240
0314  3700            C   PW
                    * * * * 00260
0315  4C70            L   MAL,R7,NC          00270
0316  3100            C   MR                 SAVE R1/M1 FILD 00280
0317  42A8            L   R2,MDL,SL+NC       CHARACTER COUNTX2 00290
                    *ENTER NORMAL PROCESSING MODE AT FURLK 00300
0318  4228            L   R2,R2,SL+NC        4X CHARACTER COUNT 00310
0319  4828            L   AR,R2,SL+NC        8 TIMES CHARACTER COUNT 0032
031A  5F08            L   DFR,X'8'           00330
031B  E2A7            S   R2,MDL             FORM 7 X CHARACTER COUNT BY
                    *NORMAL PHASE INTERRUPT SERVICE 00350
031C  5B01            L   MAH,X'1'           00390
031D  5CA0            L   MAL,X'A0'          ADDRESSES OF ASSEMBLY/PHASE
031E  3100            C   MR                 FETCH PHASE 00420
                    * * * * 00430
031F  43A0            L   R3,MDL,NC          SAVE PHASE COUNT 00440
                    *OUTPUT 1BIT FOR 8 LINES 00450
0320  5B02            L   MAH,X'2'           INCREMENT MAR 00460
0321  5C80            L   MAL,X'80'          WRITE BUFFER 00470
0322  3100            C   MR                 00480
0323  4D30            L   SDR,R3,NC          PHASE COUNT (0-3) TO SCANNER
0324  5E08            L   SCR,L(CMD)         SEND COMMAND 00500
0325  2200   TS5      T   SYN                00510
0326  1125            B   L,TS5              00520
0327  5E00            L   SCR,X'0'           RELEASE 00530
0328  4DA0            L   SDR,MDL,NC         00540
0329  5E40            L   SCR,L(DA)          OUTPUT DATA (NEGLECT IF PHAS
032A  2200   TS7      T   SYN                00560
032B  112A            B   L,TS7              00570
```

R161-7–Continued

```
032C  5E00          L   SCR,X'0'          RELEASE DEVICE,AUTOMATICALLY
              *8 LINES OUTPUT 00590
032D  5801          L   MAH,X'1'          LOAD BIAS 00600
032E  56A8          L   R6,X'A8'          READ BUFFER
032F  5740          L   R7,X'40'          HALFWORD COUNT 00620
0330  5802          L   AR,X'2'           HALF WORD INCREMENT 00630
0331  4C60  CYCRD   L   MAL,R6,NC         LOAD ADRS 00640
0332  5E20  RDAGN   L   SCR,L(DR)         REQUEST DATA 00650
0333  2200  TS8     T   SYN               00660
0334  1133          B   L,TS8             00670
0335  5E00          L   SCR,X'0'          RELEASE DEVICE 00680
0336  2040          T   UT                TEST TO SEE IF INCREMENT 006
0337  123B          B   G,INCRD           00700
0338  49^C          L   MDH,SDR,NC+OC     DATA TO MDH 00710
0339  3020          C   SUT               SET UF 00720
033A  1F32          B   CVGL,RDAGN        00730
033B  4ADC  INCRD   L   MDL,SDR,NC+OC     DATA TO MDL 00740
033C  3700          C   PW
033D  4779          L   R7,R7,SL+CO       00760
033E  1842          B   C,FINRD           00770
033F  C664          A   R6,R6,NC          INCREMENT ADRS 00780
0340  3010          C   CUT               CLEAR U FLOP 00790
0341  1F31          B   CVGL,CYCRD        00300
0342  3010  FINRD   C   CUT               CLEAR U FLOP 00810
            *ALL LINES HAVE BEEN INPUT TO RD BUFFER,SCANNER MAY RE
0343  4338          L   R3,R3,SL+NC       2X PHASE COUNTER 00830
0344  4338          L   R3,R3,SL+NC       4X PHASE COUNTER 00840
0345  5D00          L   SDR,X'0'          DEVICE COUNTER 00850
0346  5800          L   AR,X'0'           00360
0347  DCA8  LOOP1   A   MAL,X'A8'         READ BUFFER
0348  3100          C   MR                00880
0349  5680          L   R6,X'80'          MSH OF MASK 00890
034A  5700          L   R7,X'00'          LSH OF MASK 00900
034B  4490          L   R4,MDH,NC         MSH OF DATA 00910
034C  45A0          L   R5,MDL,NC         LSH OF DATA 00920
034D  4C30          L   MAL,R3,NC         ADDRESS OF PHASE ACTIVITY BL
034E  3100          C   MR                FETCH PROPER PHASE 00940
034F  4090          L   R0,MDH,NC         MSH OF PHASE ACTIVITY BLOCK
0350  41A0          L   R1,MDL,NC         LSH OF PHASE ACTIVITY BLOCK
0351  4119  LOOP2   L   R1,R1,SL+CO       SHIFT LSH OF PHASE ACTIVITY
0352  400B          L   R0,R0,SL          SHIFT MSH OF PHASE ACTIVITY
0353  1874          B   C,ACTBST          BRANCH IF ACTIVITY BIT SET 0
0354  4559          L   R5,R5,SL+CO       SHIFT LSH OF DATA C1000
0355  444B          L   R4,R4,SL          SHIFT MSH OF DATA C1010
0356  18D6          B   C,SFTMSK          IF CARRY,NEGLECT PHASE 01020
0357  2040  GOACT1  T   UT                FIRST OR SECOND HALFWORD 010
0358  12FA          B   G,HW21            01040
0359  5CAC          L   MAL,X'AC'
035A  3100          C   MR                01060
035B  5F00  RTPH21  L   DFR,X'0'          CLEAR THE FLAG REGISTER 0107
035C  4893          L   AR,MDH            LOAD THE MOST SIG HALF OF SU
035D  8967          N   MDH,R6            AND IN MSH OF DEVICE MASK 01
035E  13D6          B   GL,SFTMSK         01100
035F  48A3          L   AR,MDL            LOAD THE LEAST SIG HALF OF S
0360  8A77          N   MDL,R7            01120
0361  13D6          B   GL,SFTMSK         01130

0362  3100          C   MR                MUST SET ACTIVITY IN SUM ACT
0363  4860          L   AR,R6,NC          MSH OF DEVICE MASK 01150
0364  6994          O   MDH,MDH,NC        OR IN ACTIVITY BIT 01160
0365  4870          L   AR,R7,NC          LSH OF DEVICE MASK 01170
```

R161-7-Continued

```
0366  6AA4           O   MDL,MDL,NC       OR IN ACTIVITY BIT 01180
0367  3700           C   PW
0368  580C  GOACT    L   AR,X'0C'         01200
0369  C837           A   AR,R3            01210
036A  5AE4           L   MDL,X'E4'        01220
036B  CCA7           A   MAL,MDL          01230
036C  186E           B   C,CORR           01240
036D  6CC7           O   MAL,MAL          01250
036E  3100  CORR     C   MR               01260
036F  4890           L   AR,MDH,NC        01270
0370  6964           O   MDH,R6,NC        SET PHASE ACTIVITY BIT FOR 0
0371  48A0           L   AR,MDL,NC        01290
0372  6A74           O   MDL,R7,NC        THE DEVICE NUMBER 01300
0373  1FD5           B   CVGL,SFTCP       01310
0374  5820  ACTBST   L   AR,X'20'         BASE ADRS OF ASSEMBLY REGIST
0375  CCD4           A   MAL,SDR,NC       ADRS OF ASSEMBLY REGISTER FO
0376  3100           C   MR               01340
0377  4559           L   R5,R5,SL+CO      SHIFT LSH OF DATA 01350
0378  444B           L   R4,R4,SL         SHIFT MSH OF DATA 01360
0379  4AA7           L   MDL,MDL,SR       SHIFT IN CARRY 01370
037A  4997           L   MDH,MDH,SR       01380
037B  18D5           B   C,SFTCP          01390
037C  5860  WAASSB   L   AR,X'60'         BASESBADRS OF TRANSFER BUFFE
037D  CCD4           A   MAL,SDR,NC       ADDRESS OF CORRECT TRANSFER
037E  4999           L   MDH,MDH,SL+CO    01420
037F  4AAB           L   MDL,MDL,SL       01430
0380  4997           L   MDH,MDH,SR
0381  3700           C   PW
0382  5820           L   AR,X'20'         ADDRESS OF ASSEMBLY REGISTER
0383  CCD4           A   MAL,SDR,NC       DEVICE 01460
0384  5AFD           L   MDL,X'FD'        01470
0385  59FF           L   MDH,X'FF'        01480
0386  3700           C   PW
0387  4C30           L   MAL,R3,NC        01500
0388  3100  RSTPHR   C   MR               FETCH PHASE ACTIVITY BLOCK O
0389  4860           L   AR,R6,NC         MSH OF MASK TO AR 01520
038A  A994           X   MDH,MDH,NC       RESET PHASE ACTIVITY BIT IF
038B  4870           L   AR,R7,NC         LSH OF MASK TO AR C1540
038C  AAA4           X   MDL,MDL,NC       RESET PHASE ACTIVITY BIT IF
038D  3700           C   PW
038E  2040           T   UT               FIRST OR SECOND HW 01570
038F  12FD           B   G,HW41           BRANCH IF SECOND HALFWORD 01
0390  5800           L   AR,X'0'          INCREMENT FOR FIRST HALFWORD
0391  DCAC  RTN41    A   MAL,X'AC'        SUM ACTIVITY BLOCK
0392  3100           C   MR               01610
0393  4860           L   AR,R6,NC         LOAD MSH OF MASK TO AR 01620
0394  A994           X   MDH,MDH,NC       RESET ACTIVITY BIT 01630
0395  4870           L   AR,R7,NC         LOAD LSH OF MASK TO AR 01640
0396  AAA4           X   MDL,MDL,NC       01650
0397  1FD5           B   CVGL,SFTCP       01660
0398  5CA0  ALLFIN   L   MAL,X'A0'        01670
0399  3110           C   MR+CUT           01680
039A  5801           L   AR,X'1'          INCREMENT 01690
039B  CAA4           A   MDL,MDL,NC       INCREMENT PHASE COUNTER 0170
039C  5806           L   AR,X'6'          MAX PHASE COUNT 01720
039D  E7A4           S   R7,MDL,NC        LESS THEN PHASE COUNT 7 0173
039E  11E2           B   L,REST           01740
039F  45A3           L   R5,MDL           SAVE INCREMENTED PHASE COUNT

03A0  3700  RTRST    C   PW
03A1  5CA2           L   MAL,X'A2'        CHARACTED DISASSEMBLY COUNTE
03A2  3100           C   MR
```

R161-7-Continued

```
03A3  5801             L    AR,X'1'
03A4  CAA7             A    MDL,MDL          INCREMENT CHARACTER DISASSE
03A5  4820             L    AR,R2,NC
03A6  E7A4             S    R7,MDL,NC
03A7  11E4             B    L,CHRC           01770
03A8  3700             C    PW
03A9  4F50             L    DFR,R5,NC
           *ALL DATA HAS NOW BEEN PROCESSED,WILL NOW DISASSEMBLE
03AA  1CC5             B    CV,ENDISP        OK EXIT
03AB  5802             L    MAH,X'2'         PROPER OUTPUT BLOCK 01820
03AC  43A8             L    R3,MDL,SL+NC     FORM NEW PHASE COUNT X8 0183
03AD  5C82             L    MAL,X'82'        DISASSEMBLY POINTER 01840
03AE  3100             C    MR               01850
03AF  4338             L    R3,R3,SL+NC      01860
03B0  4338             L    R3,R3,SL+NC      01870
03B1  48A3             L    AR,MDL           DISASSEMBLY BASE 01880
03B2  C334             A    R3,R3,NC         01890
03B3  4338             L    R3,R3,SL+NC      01900
03B4  5802   DISL      L    AR,X'2'          INCREMENT HW 01910
03B5  5780             L    R7,X'80'         COUNT OF 8 01920
03B6  5600             L    R6,X'0'          INITIALIZE DISASSEMBLY STORE
03B7  4C30   BCKDIS    L    MAL,R3,NC        01940
03B8  3100             C    MR               FETCH WD TO BE DISASSEMBLED
03B9  4995             L    MDH,MDH,SR+CO    SHIFT MSH OF WD 01960
03BA  4AA7             L    MDL,MDL,SR       SHIFT LSH OF WD 01970
03BB  18C1             B    C,ORIN           01980
03BC  3700   BCKDS1    C    PW
03BD  4775             L    R7,R7,SR+CO      INCREMENT COUNT MASK 02000
03BE  18C5             B    C,ENDISP         0129
03BF  C334             A    R3,R3,NC         INCREMENT ADDRESS 02020
03C0  1FB7             B    CVGL,BCKDIS      02030
03C1  4860   ORIN      L    AR,R6,NC         02040
03C2  6674             O    R6,R7,NC         OR IN ONE BIT 02050
03C3  5802             L    AR,X'2'          02060
03C4  1FBC             B    CVGL,BCKDS1      02070
03C5  5500   ENDISP    L    R5,X'0'          PSW CC ZERO
03C6  5B00   ENDIS     L    MAH,X'0'
03C7  5C24             L    MAL,X'24'
03C8  3100             C    MR
03C9  4A53             L    MDL,R5           STORE CC IN PSW
03CA  3700             C    PW
             * * * * 02150
             * * * * 02160
             * * * * 02170
             * * * * 02180
             * * * * 02190
03CB  5C26             L    MAL,L(LOCCNT)    02210
03CC  3150             C    MR+CUT+SBR       02220
03CD  5D00             L    RAH,H(FSTSTA)    02230
03CE  4093             L    R0,MDH           02240
03CF  41A3             L    R1,MDL           02250
03D0  5B02             L    MAH,X'2'
03D1  5C80             L    MAL,X'80'        COPY WRITE DATA TO WRITE BUF
03D2  4A63             L    MDL,R6
03D3  3700             C    PW
03D4  5E08             L    RAL,L(FSTSTA)    02260
03D5  3700   SFTCP     C    PW
03D6  48D0   SFTMSK    L    AR,SDR,NC        02280
03D7  DD02             A    SDR,X'2'         INCREMENT DEVICE COUNT 02290
03D8  4665             L    R6,R6,SR+CO      02300
```

R161-7 – Continued

```
03D9  4777          L     R7,R7,SR       SHIFT LSH OF MASK 02310
03DA  18DC          B     C,NXTWDP       FIRST HALFWORD SCANNED IF BR
03DB  1F51          B     CVGL,LOOP2     NEXT DEVICE ACTIVITY 02330
03DC  2040  NXTWDP  T     UT             TEST UFLOP 02340
03DD  1298          B     G,ALLFIN       02350
03DE  3020          C     SUT            SET UFLOP TO DENOTE 2ND HALF
03DF  5802          L     AR,X'2'        HW INCREMENT 02370
03E0  C334          A     R3,R3,NC       INCREMENT PHASE POINTER 0238
03E1  1F47          B     CVGL,LOOP1     02390
03E2  5A00  REST    L     MDL,X'0'       RESET PHASE COUNT 02400
03E3  1FA0          B     CVGL,RTRST-1   02410
03E4  5900  CHRC    L     MDH,X'0'       RESET ASSEMBLY COUNT 02420
03E5  3700          C     PW
03E6  578E          L     R7,X'8E'       2'S COMP OF 32 HW COUNT 0244
            * * * * 02450
03E7  5300          L     R3,X'0'        02460
03E8  5802          L     MAH,X'2'       BIAS 02470
            * * * * 02480
03E9  5C82          L     MAL,X'82'      DISASSEMBLY POINTER 02490
03EA  3100          C     MR             FETCH POINTER 02500
03EB  40A3          L     R0,MDL         POINTER EQUAL TO X'240' 0251
03EC  5840          L     AR,X'40'       EXCLUSIVE OR TO COMAL 02520
03ED  AAA4          X     MDL,MDL,NC     POINTER 02530
03EE  5802          L     AR,X'2'        02540
03EF  3700          C     PW
03F0  59FF          L     MDH,X'FF'      IDLE LINE FILLER 02560
03F1  5AFF          L     MDL,X'FF'      02570
03F2  4C00  LOOPTR  L     MAL,R0,NC      02580
03F3  3700          C     PW
03F4  C004          A     R0,R0,NC       INCREMENT COUNT 02600
03F5  C774          A     R7,R7,NC       DECREMENT COUNT 02610
03F6  11F2          B     L,LOOPTR       DO AGAIN 02620
03F7  56FF          L     R6,X'FF'       IDLE LINE FILLER
03F8  5504          L     R5,X'04'
03F9  1FC6          B     CVGL,ENDIS     EXIT
03FA  5CAE  HW21    L     MAL,X'AE'
03FB  3100          C     MR             BLOCK 02650
03FC  1F5B          B     CVGL,RTPH21    02660
03FD  5802  HW41    L     AR,X'2'        INCREMENT FOR SECOND HALFWOR
03FE  1F91          B     CVGL,RTN41     02680
            * * * * 02700
            * * * * 02720
            ADRS    EQU   X'80'          02730
            DR      EQU   X'20'          02740
            SR      EQU   X'10'          02750
            DA      EQU   X'40'          02760
            CMD     EQU   X'08'          02770
            ACK     EQU   X'04'          02780
            FSTSTA  EQU   X'08'          02790
            LOCCNT  EQU   X'26'          02800
```

We claim:

1. A time division multiplexor system for multiplexing and demultiplexing between serial data in characters at a predetermined bit rate from a plurality of data lines and data in the form of parallel characters at buss means comprising individual data line means for each serial data line with each data line means being operable for loading and unloading data between its respective serial data lines and said buss means, multiplexor control means for controlling groups of said data line means to load and unload said data, said multiplexor control means including clock means for providing signals at intervals equal to a predetermined number times said bit rate of said serial data, an automatic data processor, memory means, said processor for providing control signals for controlling (1) input serial data flow from each data line means through said buss means and processor into said memory means, and (2) output data in parallel characters flow from said buss means and said processor into said memory means, and fixed wired program means having logic connections to said processor, said memory means, said multiplexor control means and said clock means, said fixed wired program means having fixed program instruction means (1) to control the operation of said multiplexor control means in response to said control signals, (2) to determine the start of a character from said serial data flow through said data line means controlled from said multiplexor control means, and (3) to control the strobing of said input serial data and storing of said strobed data in said memory means.

2. The time division multiplexor system of claim 1 in which said fixed wired program means includes a first fixed instruction program means forming a sum activity program to indicate when a selected one of said data lines is (1) idle thereby a predetermined transition in the state of said line indicates the start of a character, and (2) active thereby a transition in the state of the line does not represent the start of a character, and a second fixed instruction program means forming a plurality of phase activity programs responsive to said first fixed instruction program means to indicate the time at which said data from said multiplexor control means is to be sampled.

3. The time division multiplexor system of claim 2 in which each data line means includes first and second register means, said multiplexor control means including test means for closing a loop between said first and second register means whereby a bit of data flows from said buss means through said first and second register means and back to said buss means thereby to allow the check of the validity of said data.

4. A digital time division multiplexor system for multiplexing and demultiplexing between serial data in characters at a predetermined bit rate from a plurality of data lines and data in the form of parallel characters at buss means comprising individual data line means for each serial data line with each data line means being operable for loading and unloading data between its respective serial data lines and said buss means, multiplexor control means for controlling in sequence groups of said data line means to load and unload said data, said multiplexor control means including clock means for providing clock signals at intervals equal to seven times said bit rate of said serial data, an automatic data processor, memory means, said processor for controlling (1) input serial data flow from said data line means through said buss means and processor into said memory means, said serial data being converted into parallel characters in said memory means which then flows through said processor to said buss means and (2) output data in parallel characters flow from said buss means and said processor into said memory means, said parallel characters being converted to serial data in said memory means which then flows through said processor, said buss means being connected to said data line means and fixed program means having fixed program instruction means, said fixed wired program means connected to said processor to provide logic connections for said multiplexor control means and said memory means, said fixed program instruction means (1) to control the operation of said multiplexor control means, (2) to determine the start of said characters, (3) to control the strobing of said input serial data in said memory means in which said information content of each bit of said serial data is recognized to within 7.15 percent of the center of each bit and (4) to store said strobed data in said memory means.

5. The time division multiplexor system of claim 4 in which said fixed wired program means includes a first fixed instruction program means forming a sum activity program to indicate when a selected one of said data lines is (1) idle thereby a predetermined transition in the state of said line indicates the start of a character, and (2) active thereby a transition in the state of the line does not represent the start of a character, and a second fixed instruction program means forming a plurality of phase activity programs responsive to said first fixed instruction program means to indicate the time at which said data from said multiplexor control means is to be sampled.

6. The time division multiplexor system of claim 5 in which said memory means includes an assembly register and a read buffer, said read buffer storing the serial data from said plurality of data lines, said phase activity blocks providing a count of three of said intervals after the determination of said start of a character on a selected data line for a new phase count and the bit data in said read buffer at that time being strobed and stored in said assembly register, the remaining bits of the character being strobed at said new phase count.

7. The time division multiplexor system of claim 4 in which said fixed wired program means includes assembly registers in which the characters of each of the serial data lines are assembled, said fixed wired program means including means for generating a mask which indicates the number of bits in a character and for continually shifting the mask into said assembly registers as said character is being assembled and means for detection of a predetermined bit in said mask for indication of the completion of said character within said assembly registers of said memory means to permit disassembly of said character.

8. The time division multiplexor system of claim 7 in which said fixed wired program means includes transfer buffers for receiving a full character after it has been assembled in said assembly register thereby allowing a character to be assembled in said assembly register over a full character period.

9. The time division multiplexor system of claim 8 in which said fixed wired program means include disassembly registers a first group of disassembly registers providing placement of the parallel characters to be disassembled and a second group of disassembly registers temporarily storing the disassembled data to be transmitted to said individual data line means.

10. The time division multiplexor system of claim 4 in which each data line means includes first register means for output data and second register means for input data, said multiplexor control means including a test circuit connected to each of said first and second register means for closing a loop between said first and second register means whereby a bit of data flows from said buss means through said first and second register means and back to said buss means thereby to allow the check of the validity of said data.

11. A method using an automatic data processing system to accomplish time division multiplexing and demultiplexing between (1) serial data in characters at a predetermined bit rate from a plurality of data lines and (2) data in the form of parallel characters which comprises the steps of determining the start of a character by recognizing when a selected one of said data lines is (1) idle whereby a predetermined transition in the state of said line indicates the presence of a start bit and (2) active whereby a transition in the state of said line does not represent the presence of a start bit, generating clock signals at intervals equal to seven times said bit rate of said serial data, providing a count of three of said intervals after the determination of said start of a character on a data line thereby generating a new phase count, strobing the data of the first bit of the character and each of the remaining bits of the character at the new phase count and storing that information, and generating a mask which indicates the number of bits in a character and for continually shifting the mask as said characters are assembled and upon detection of a predetermined bit in said mask said character has been completed.

12. The method of claim 11 in which there is further provided the step of receiving a full character after it has been assembled thereby allowing a character to be assembled over a full character period.

13. The method of claim 12 in which there is provided the further steps of placement of the parallel characters to be disassembled and temporarily storing the disassembled data to be transmitted to the plurality of serial data lines.

14. The method of claim 11 in which there is provided the further step of returning a bit of output data to be reevaluated for checking the validity of said data.

15. A method using an automatic data processing system to accomplish time division multiplexing and demultiplexing between serial data in characters at a predetermined bit rate and data in the form of parallel characters which comprises the steps of determining the start of a character by recognizing when a line carrying the character is (1) idle whereby a predetermined transition in the state of said line indicates the presence of a start bit and (2) active whereby a transition in the state of said line does not represent the presence of a start bit, generating clock signals at predetermined intervals of said bit rate, providing a count of three of said intervals after the determination of said start of a character thereby generating a new phase count, strobing the data of each bit of the character at the new phase count and strobing and assembling that information with the remaining bits of that character being strobed at the new phase count, and receiving a full character after it has been assembled.